US006707940B1

(12) United States Patent
Qian

(10) Patent No.: US 6,707,940 B1
(45) Date of Patent: Mar. 16, 2004

(54) METHOD AND APPARATUS FOR IMAGE SEGMENTATION

(75) Inventor: Richard J. Qian, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,061

(22) Filed: Mar. 31, 2000

(51) Int. Cl.$^7$ .................................................. G06K 9/34
(52) U.S. Cl. ........................ 382/173; 382/264; 382/261
(58) Field of Search ................................ 382/263, 173, 382/308, 266, 264, 164, 199; 358/3.27; 348/586

(56) References Cited

U.S. PATENT DOCUMENTS

| | | | | |
|---|---|---|---|---|
| 4,809,349 A | * | 2/1989 | Herby et al. ................. | 382/270 |
| 5,034,986 A | * | 7/1991 | Karmann et al. ........... | 382/173 |
| 5,390,264 A | * | 2/1995 | Ishihara et al. ............. | 382/266 |
| 5,819,035 A | | 10/1998 | Devaney et al. | |
| 5,914,748 A | * | 6/1999 | Parulski et al. ............. | 348/239 |
| 6,005,582 A | | 12/1999 | Gabriel et al. | |
| 6,011,595 A | | 1/2000 | Henderson et al. | |

OTHER PUBLICATIONS

Gordon et al. "Background estimation and removal based on range and color," Proc. IEEE Conference on Computer Vision and Pattern Recognition, Fort Collins, CO, pp. 459–464, 1999.

Qian et al. "Video background replacement without a blue screen," Proc. International Conference on Image Processing (ICIP), Kobe, Japan, pp. 143–146, 1999.

Fischl et al. "Adaptive Nonlocal Filtering: A Fast Alternative to Anistropic Diffusion for Image Enhancement", IEEE Transactions on Pattern Analysis and Machine Intelligence, Jan. 1999, vol. 21, No. 1, pp. 42–48.

Perona et al. "Scale–Space and Edge Detection Using Anisotropic Diffusion," IEEE Transactions on Pattern Analysis and Machine Intelligence. Vol. 12, No. 7, Jul. 1990, pp. 629–639.

Schreiber, William F., "Image Processing for Quality Improvement," Proceedings of the IEEE, vol. 66, No. 12, Dec. 1978, pp. 1640–1651.

* cited by examiner

*Primary Examiner*—Amelia M. Au
*Assistant Examiner*—Colin LaRose
(74) *Attorney, Agent, or Firm*—Pillsbury Winthrop LLP

(57) ABSTRACT

A method and apparatus is described that smoothes images within regions but not across boundaries. In one embodiment, a segmentation map is smoothed. Based on the color difference between pixels in an input frame and corresponding pixels in a background image, this segmentation map indicates the likelihood that each pixel in the input frame belongs to the foreground. The smoothed segmentation map may be processed further to reduce misclassification errors. Based on the segmentation map, the foreground portion of the image is superimposed over a new background image.

31 Claims, 10 Drawing Sheets

METHOD AND APPARATUS FOR IMAGE SEGMENTATION

BACKGROUND OF THE INVENTION

1. Field of the Invention

This invention relates to image processing. More particularly, this invention relates to image segmentation.

2. Description of the Related Art

It is often desirable to obtain a sequence of images in which the background that originally appeared in the images has been replaced with a different background. One popular technique for background replacement is called chroma-key. In this technique, images of the foreground objects or scene are captured in front of a uniformly lit background. This background is usually bright blue (chroma-key is also called 'blue-screen imaging') but may be red or green as well. The technique is completed by replacing those areas of the images that have the background color with corresponding areas of a different background image.

While chroma-key may be used with either photographic or electronic image capture, it is a cumbersome process best performed in a professional studio. Thus, the use of chroma-key for real-time video production and for most consumer applications is limited. Other existing approaches to background replacement are similarly unsuitable for many applications because they require at least two cameras or because they produce inaccurate segmentation results along the foreground-background boundaries.

It is known that a segmentation map may be obtained by comparing an original image having a foreground and background to an image having only the background. However, such a map is likely to contain classification errors caused, for example, by shadows, reflections, and other artifacts within the background that appear only when the foreground objects are added to the scene. It is also known that the number of classification errors may be reduced in some cases by applying an anisotropic diffusion filter to smooth the segmentation map.

A method of applying anisotropic diffusion to image processing was described by Perona and Malik in 'Scale-Space and Edge Detection Using Anisotropic Diffusion,' *IEEE Trans. PAMI*, vol. 12, no. 7, July 1990, pp. 629–39. This method adjusts each pixel's value with a diffusion offset that is a function of the pixel's four nearest-neighbor differences. The function used to calculate the diffusion function must be nonlinear and may require a computationally expensive function such as an exponential. Unfortunately, filters that use anisotropic diffusion are susceptible to impulsive noise and require a large number of iterations to perform a desired degree of smoothing.

It is desirable to obtain a method and apparatus for background replacement that does not require such special devices as a blue screen or more than one camera, requires no prior knowledge about the foreground objects, performs an accurate segmentation of foreground and background, will produce results in real-time, and is rapid and robust to noise.

DETAILED DESCRIPTION

Figure 1:
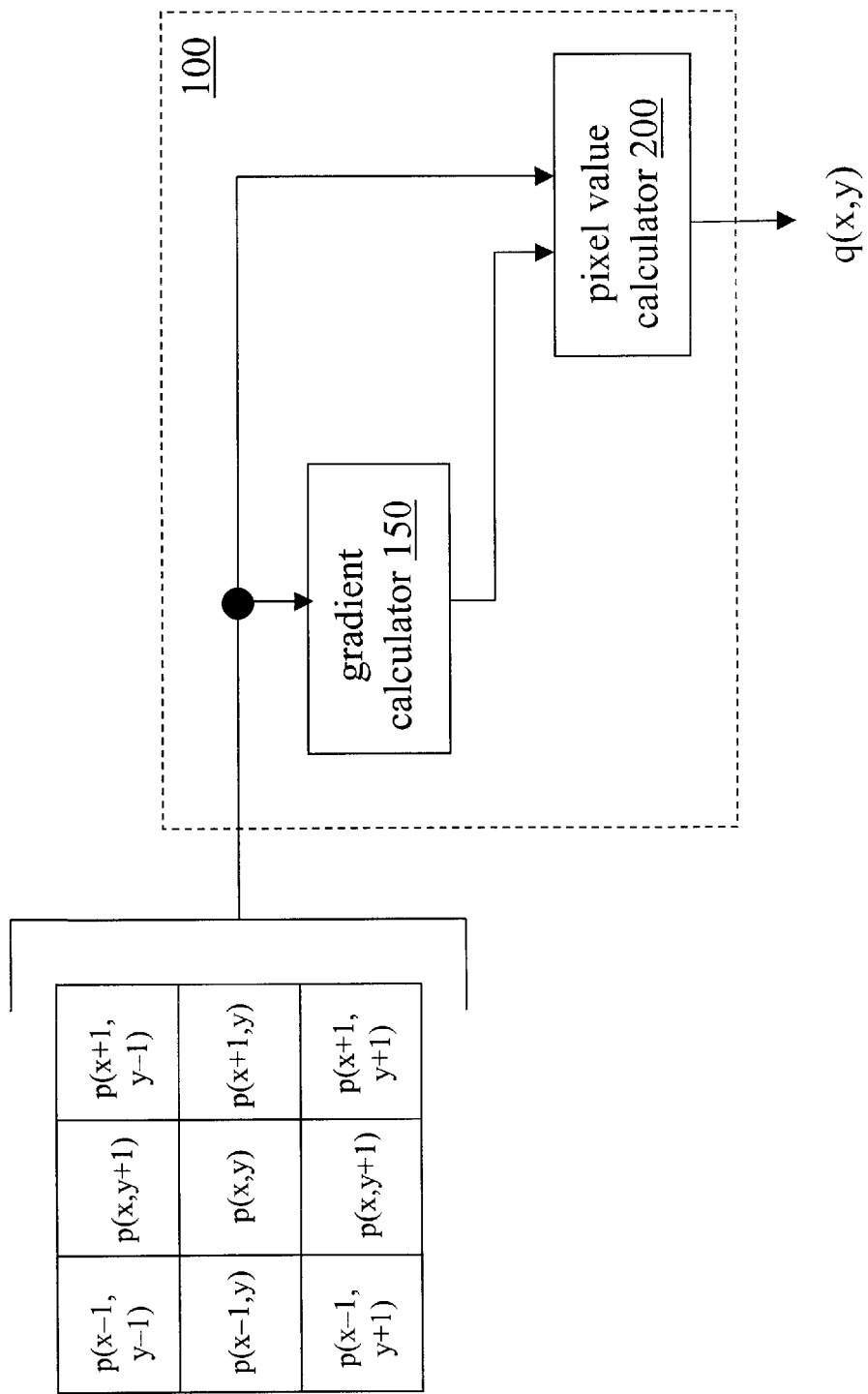
FIG. 1 shows a block diagram for an apparatus according to an embodiment of the invention.
Figure 2:
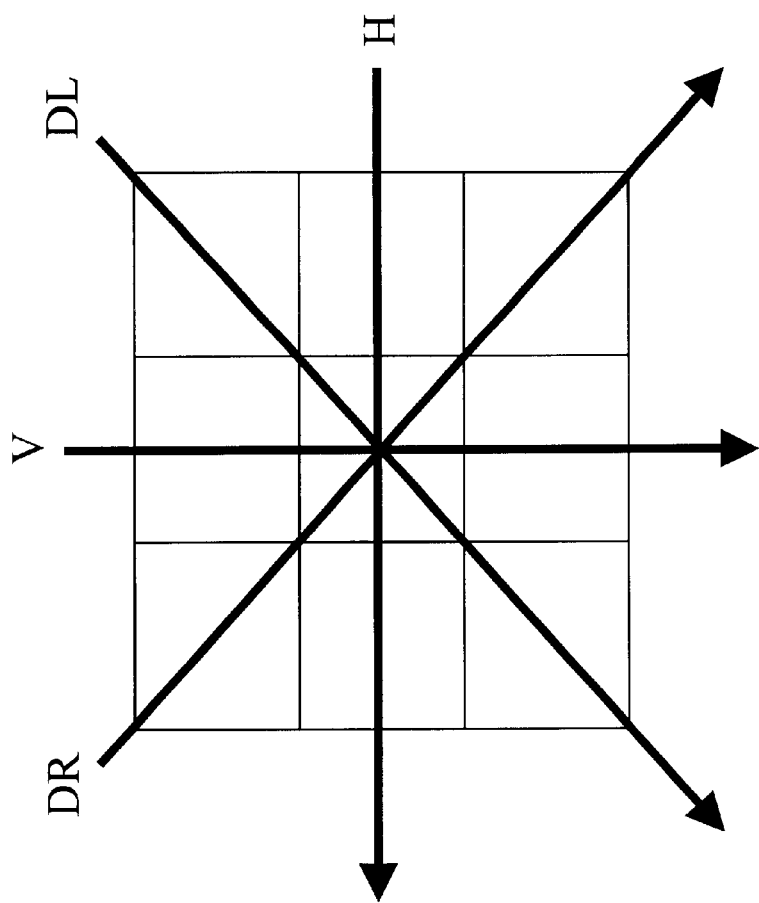
FIG. 2 shows the vertical (V), horizontal (H), diagonal left (DL), and diagonal right (DR) directions relative to a center pixel.

FIG. 1 shows a block diagram for an apparatus 100 according to an embodiment of the invention. Gradient calculator 150 receives the values of a center pixel (at location (x,y)) and its eight-neighbors. From these values, gradient calculator 150 calculates gradients in four directions according to the following expressions:

$$\nabla_H = p(x-1,y) - p(x+1,y),$$

$$\nabla_V = p(x,y-1) - p(x,y+1),$$

$$\nabla_{DR} = p(x+1,y-1) - p(x-1,y+1),$$

$$\nabla_{DL} = p(x-1,y-1) - p(x+1,y+1),$$

where $\nabla_H$, $\nabla_V$, $\nabla_{DR}$, and $\nabla_{DL}$ indicate the gradients in the horizontal (H), vertical (V), diagonal right (DR), and diagonal left (DL) directions with respect to the center pixel (as shown in FIG. 2); p(a,b) denotes the value of the pixel at column a and row b; and p(x,y) denotes the value of the center pixel.

Other implementations are possible in which gradient calculator 150 may receive the values of pixels that have a different connectivity and/or are within a different neighborhood of the center pixel, or wherein a pixel of reference is not a center pixel. In such implementations, gradient calculator 150 may calculate gradients in a different number of directions, in non-orthogonal directions, and/or with expressions that include a value of a pixel of reference.

Gradient calculator 150 also calculates a smoothing factor for each of the four directions. In one implementation, gradient calculator 150 uses the gradients to calculate the smoothing factors according to the following expression:

$$\rho_i = 1 - (|\nabla_i|/R_p),$$

for all i $\in$ {H, V, DR, DL}. In this expression, $R_p$ is the highest possible value in the pixel range. For example, $R_p=1$ for a pixel whose only possible values are 0 and 1 (i.e. a binary pixel), and $R_p=255$ for an 8-bit pixel value. In another implementation, gradient calculator 150 may calculate the smoothing factors directly from the values of the neighbor pixels or may calculate the smoothing factors according to a different expression. Likewise, the smoothing factors may be normalized to a different range than the range of from 0 to 1 as in the expression above.

Pixel value calculator 200 receives the smoothing factors and pixel values and generates a new value q(x,y) for the center pixel according to the following expression:

$$q(x, y) = p(x, y) - \left[p(x, y) \times \frac{\rho_H + \rho_V + \rho_{DR} + \rho_{DL}}{4}\right] + \frac{1}{4}\sum_i [\rho_i \times (n_{i1} + n_{i2})],$$

for all $i \in \{H, V, DR, DL\}$, where $n_{i1}$ and $n_{i2}$ are the two eight-neighbors of the center pixel that lie in the direction i. In this example, the value $q(x,y)$ is expressed as a sum of three terms: the original value of the center pixel (the leftmost term on the right-hand side), a center pixel contribution (the center term on the right-hand side), and a neighbor pixel contribution (the rightmost term on the right-hand side). Note that in another implementation, pixel value calculator 200 may receive the sums $(n_{i1}+n_{i2})$, or averages of each pair $n_{i1}$ and $n_{i2}$, instead of the individual neighbor pixel values. Likewise, pixel value calculator 200 may calculate the value $q(x,y)$ according to a different but equivalent form of the expression above.

If the difference between the values of each pair of eight-neighbors $n_{i1}$, $n_{i2}$ is small, then apparatus 100 will produce a value $q(x,y)$ that is similar to the value $p(x,y)$. As the difference between the values of a pair of eight-neighbors becomes large, the contribution of the average of that pair of eight-neighbors to the value $q(x,y)$ will increase, while the contribution of the value $p(x,y)$ to the value $q(x,y)$ will be reduced, with the amounts of the increase and reduction being related to the normalized gradient in the direction along which the two eight-neighbors lie.

In another implementation, pixel value calculator 200 may calculate the value $q(x,y)$ according to an expression that may be written as a modified form of the expression above, such that the modified expression may calculate a different value for one or more of the center pixel, center pixel contribution, and neighbor pixel contribution terms. Alternatively or in addition to such modification, pixel value calculator 200 may calculate the value $q(x,y)$ according to an expression that contains additional terms and/or lacks one or more of the terms above.

Figure 3:
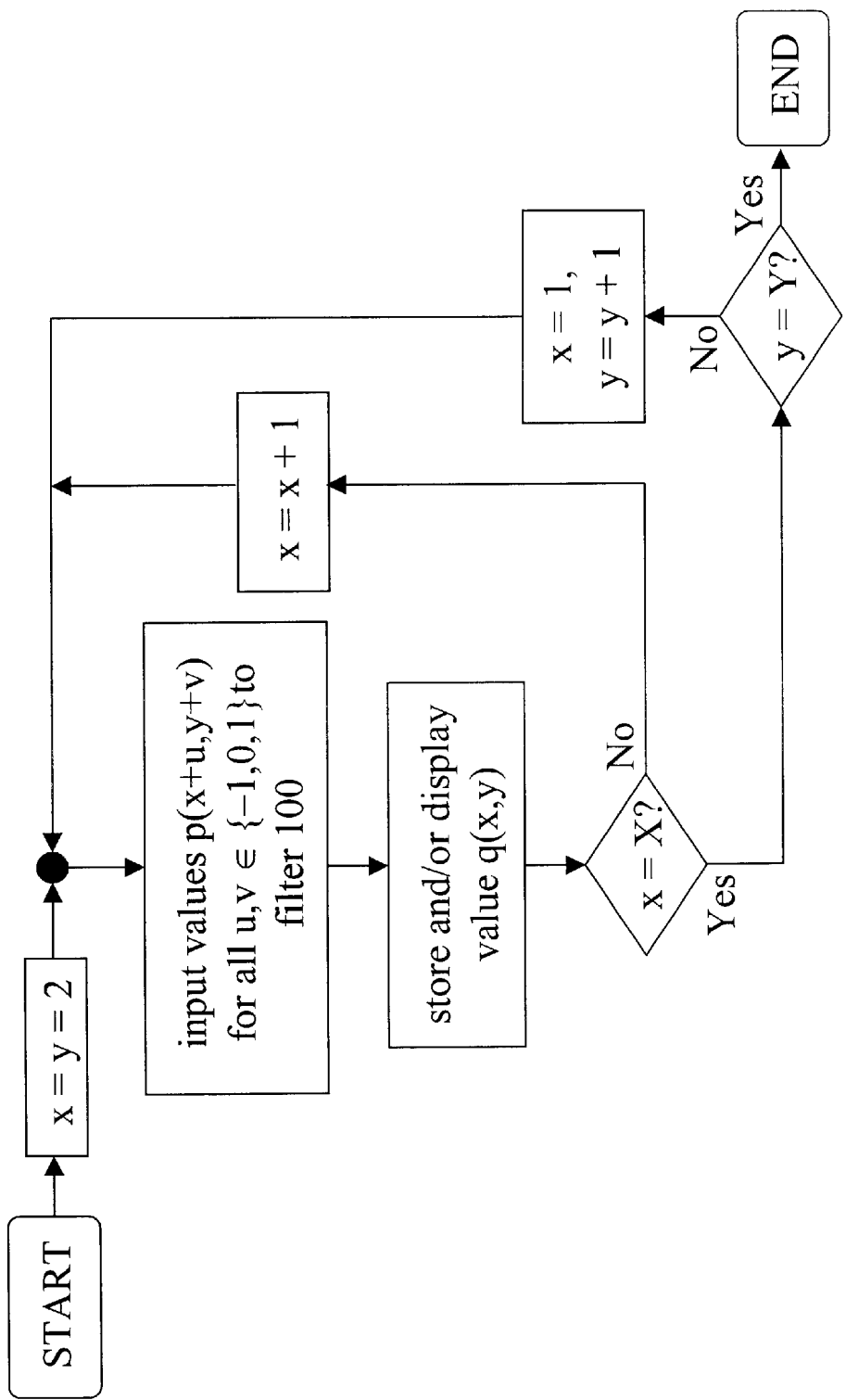
FIG. 3 shows a flowchart for a method according to an embodiment of the invention.

As shown in FIG. 3, apparatus 100 may be used to process each among all (or substantially all) of the pixels of an input image as a center pixel. In this example, the range of x in the input image is from 1 to X+1, the range of y is from 1 to Y+1, and the border pixels of the input image are not processed. In other examples, the border region may be processed differently (e.g. by padding the input and/or output images as desired). The effect of the operation in FIG. 3 is to produce an output image that is smoothed in directions where pixel values were similar (i.e. within regions) but not in directions where the gradients were large (i.e. not across region boundaries). Thus one use of apparatus 100 is to enhance an existing segmentation of an image based on pixel value.

Apparatus 100 has several advantages over a filter that uses anisotropic diffusion. For example, apparatus 100 considers more of a center pixel's neighborhood, and more directions within that neighborhood, in calculating the new center pixel value. Thus an image smoother incorporating apparatus 100 may require fewer iterations across the image to perform a comparable degree of smoothing. Another advantage of apparatus 100 is its resistance to impulsive noise. While filters that use anisotropic diffusion are notoriously susceptible to impulsive noise, apparatus 100 may eliminate such noise from an image in as little as a single iteration.

Optimizations that may be applied to apparatus 100 as described above include use of a lookup table to reduce the complexity of obtaining the values for the normalized gradients $\rho_i$ and/or of the gradient products $\rho_i \times (n_{i1}+n_{i2})$. For a given application, an appropriate tradeoff may be adopted between computational complexity and lookup table storage space.

As discussed above, FIG. 3 shows a flowchart for a method according to an embodiment of the invention. This method may be applied iteratively in order to achieve a higher degree of smoothing. For images containing pixels having multicomponent values (e.g. pixels in a color space such as RGB, CMY, CMYK, YUV, HSV, YCbCr, etc.), the method may also be applied separately and in a different fashion to one or more of the individual component planes of the image.

Figure 4:
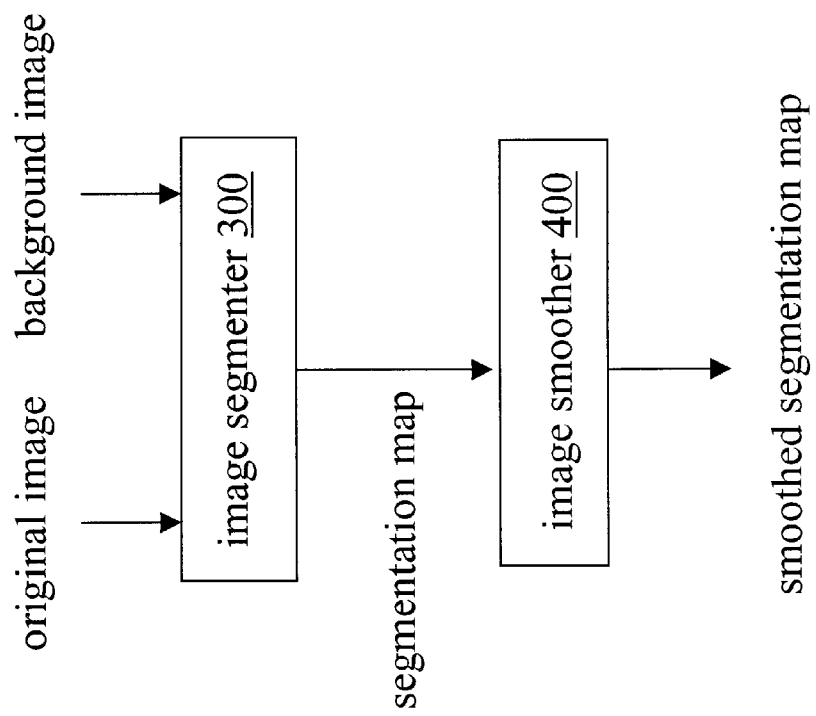
FIG. 4 shows a block diagram for an apparatus according to an embodiment of the invention.

In an apparatus according to a further embodiment of the invention, as shown in FIG. 4, image smoother 400 produces an output image by performing the method of FIG. 3 on an input image. In this case, the input image is a segmentation map produced by image segmenter 300, and the output image produced by image smoother 400 is a refined version of that map. The pixel-by-pixel operation of image segmenter 300 is explained in more detail below.

In one form, a segmentation map is a version of an image wherein the value of a pixel represents a likelihood that a corresponding pixel in the original image belongs to a predetermined object, set of objects, area, etc. (e.g. the foreground). For example, a segmentation map may be a binary version of an image wherein pixels of value 0 correspond to object pixels in the original image and pixels of value 1 correspond to background pixels.

Figure 5:
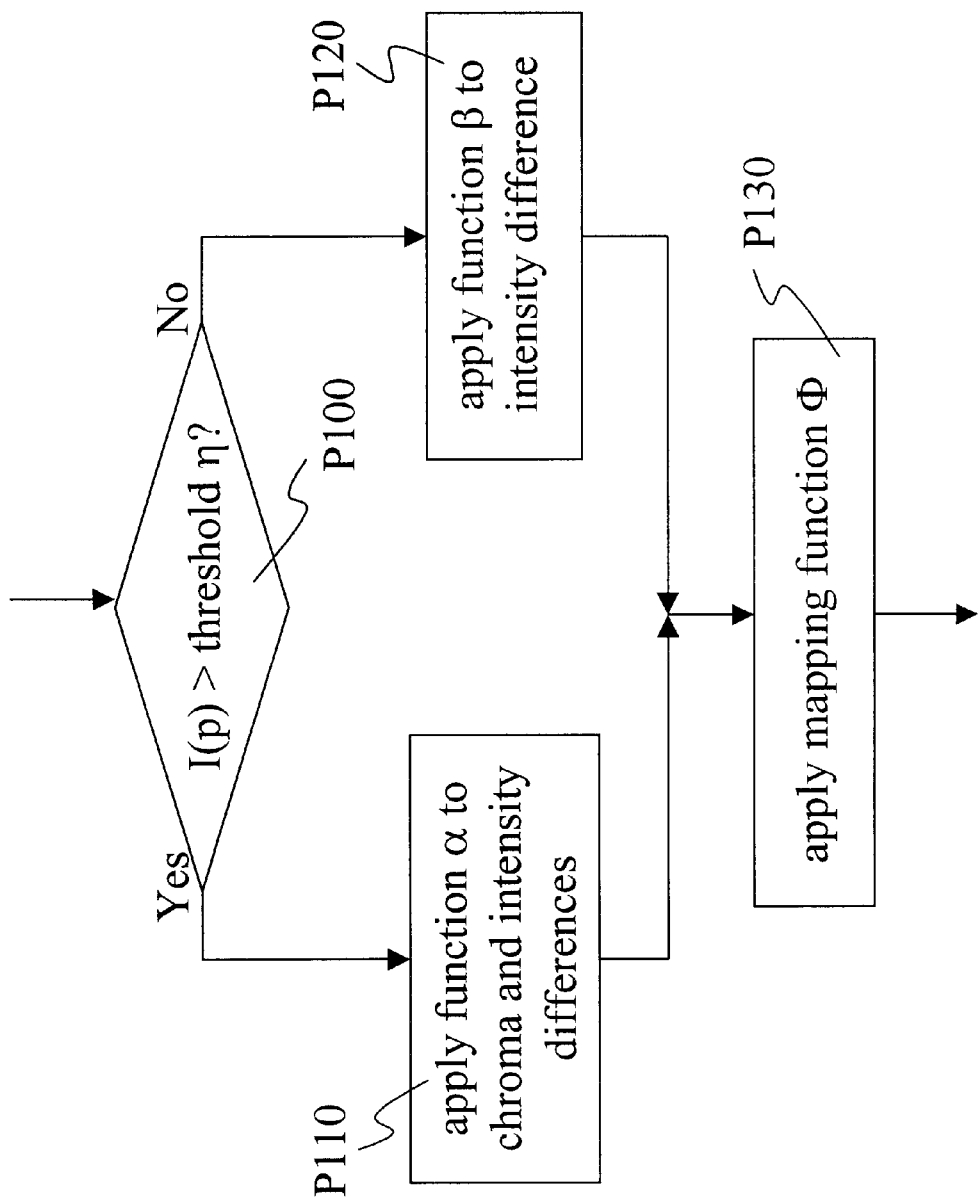
FIG. 5 shows a flowchart for the pixel-by-pixel operation of image segmentor 300.

In this example, image segmenter 300 receives an original image and a prerecorded image of the background which appears in the original image. The value of the resulting segmentation map at each pixel position is a classification probability (e.g. in the range of from 0 to 255) that is calculated as a function (as shown in FIG. 5 and discussed below) of the values of the corresponding pixels in these two images.

Each pixel p of the two input images has three components $R(p)$, $G(p)$, and $B(p)$, which range in value from 0 to 1 and represent the coordinates of the pixel's value in the RGB color subspace. The intensity $I(p)$ of a pixel p is defined as
$I(p) = \text{SUM}/3$, and the chroma components $r(p)$, $g(p)$ are defined as
$r(p) = R(p)/\text{SUM}, g(p) = G(p)/\text{SUM}$, where SUM has the value $R(p)+G(p)+B(p)$.

When the intensity of a pixel is low, the chroma information of that pixel is more likely to be noisy and unreliable, whereas the chroma information is most effective and reliable when the intensity is high. Therefore, each pixel classification decision made by image segmenter 300 in this example begins with a determination (in block P 100) of whether the intensity of the pixel in the original image exceeds a predetermined threshold $\eta$.

If the test in block P100 fails (i.e. the intensity of the pixel in the original image does not exceed the threshold $\eta$), then the function $\beta$ is applied in block P120 to the difference between the intensities of the subject pixels in the original and background images:

$\beta(p) = f|I(p) - I'(p)| + h$, where the prime denotes a value relating to the pixel in the background image, f is a weighting factor, and h is an offset or threshold. Note that if h has a negative value, then $\beta(p)$ will be less than zero if the weighted absolute intensity difference is less than −h, and β(p) will be positive if that difference is greater than −h.

If the test in block P100 succeeds (i.e. the intensity of the pixel in the original image exceeds the threshold η), then the function a is applied in block P110 to the chroma and intensity space differences between the values of the subject pixels in the original and background images:

$$\alpha(p) = a\sqrt{[r(p) - r'(p)]^2 + [g(p) - g'(p)]^2} + b|I(p) - I(p)| + d,$$

where the prime again denotes a value relating to the pixel in the background image, a and b are weighting factors, and d is an offset or threshold. Note that if d has a negative value, then α(p) will be less than zero if the sum of the weighted chroma space and absolute intensity differences is less than −d, and α(p) will be positive if that sum is greater than −d.

In the above expressions for α and β, a, b, d, f, h, η are all constants whose values may be selected based upon the nature of the particular application and the desired result.

In block P130, a mapping function Φ is applied to the value α(p) or β(p) in order to obtain a valid probability value in the range of from 0 to 1. Note that in another implementation, separate mapping functions may be applied to the values α(p) and β(p), or the functions α and β may include mapping to this range or another one. In this example, Φ is a parabolic function having the form $$\Phi(u) = \min[\max[0.5 + \text{sign}(u) \cdot u^2, 0], 1].$$

The output of a method as shown in FIG. 5 as applied to all pixels in the input images is a classification probability map, wherein each pixel in the original image is classified as belonging to the foreground or to the background. However, this process may produce erroneous classifications due to ambiguities existing especially near the segmentation boundaries. By applying image smoother 400 to the segmentation map as shown in FIG. 4, it is possible to substantially reduce classification errors. Use of image smoother 400 rather than a morphological operator also preserves the concavity and boundary sharpness of the foreground objects in the image.

Figure 6:
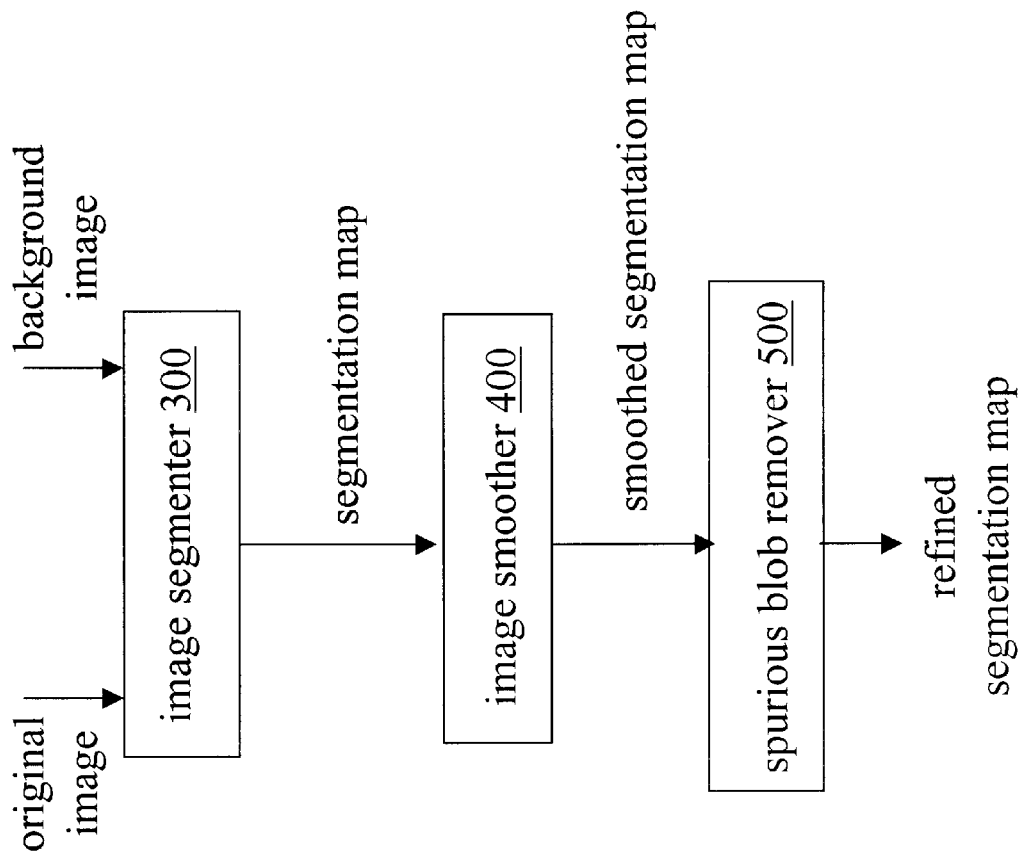
FIG. 6 shows a block diagram for an apparatus according to an embodiment of the invention.
Figure 7:
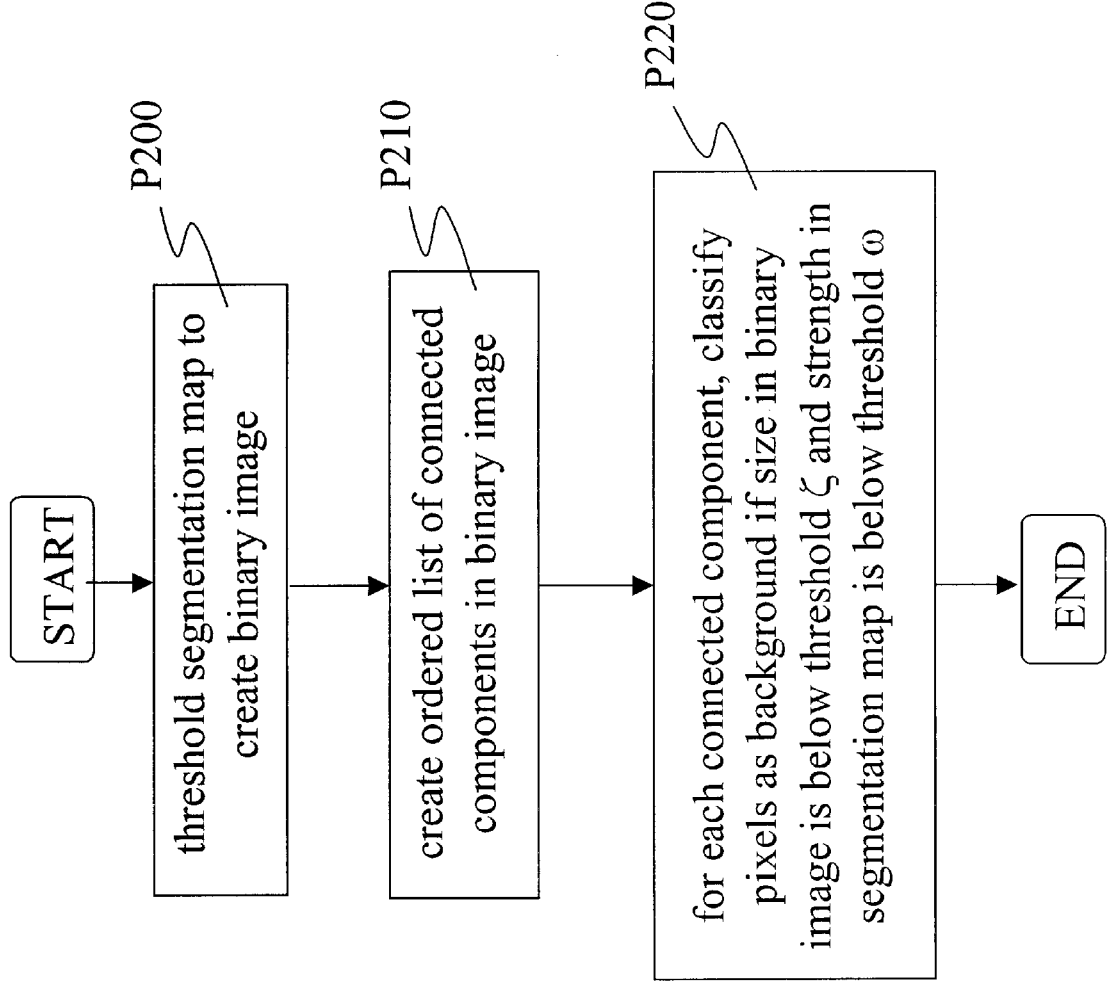
FIG. 7 shows a flowchart for the operation of spurious blob remover 500.

While applying image smoother 400 can eliminate many small artifacts in an image such as a segmentation map, artifacts that are large in comparison to an eight-neighborhood may persist through many filter iterations across the image. If the artifact has a clearly defined boundary, it may remain in the image even after an arbitrary number of filter iterations. In order to remove such artifacts, an apparatus according to a further embodiment of the invention (as shown in FIG. 6) uses a spurious blob remover, whose operation is shown in FIG. 7.

In block P200, spurious blob remover 500 thresholds the segmentation map with respect to a predetermined threshold value to obtain a binary image. Within this image, blob remover 500 identifies all connected components (excluding the background of the binary image) (block P210). For each connected component, blob remover 500 determines whether the component's size exceeds a threshold number of pixels ζ. If the component's size in pixels is less than ζ, then the strength of the artifact is determined.

In one implementation, the strength of the artifact is measured by its average intensity in the segmentation map. The average intensity of the artifact is determined by calculating the average of the intensities of the pixels in the segmentation map that correspond to the connected component's pixels in the binary image. If the artifact's strength is less than a threshold ω, then the corresponding pixels in the segmentation map are reclassified as background (block P220).

Figure 8:
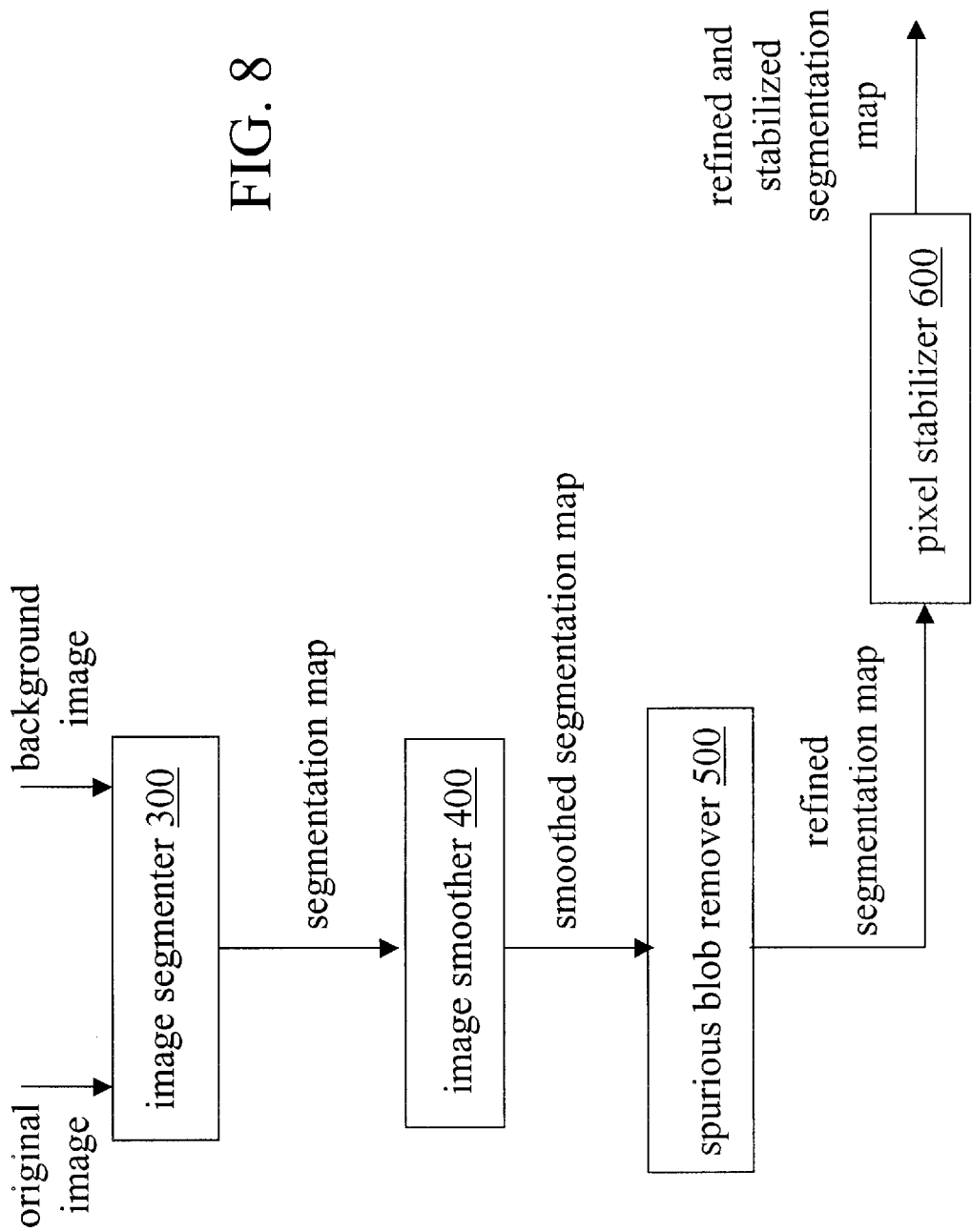
FIG. 8 shows a block diagram for an apparatus according to an embodiment of the invention.
Figure 9:
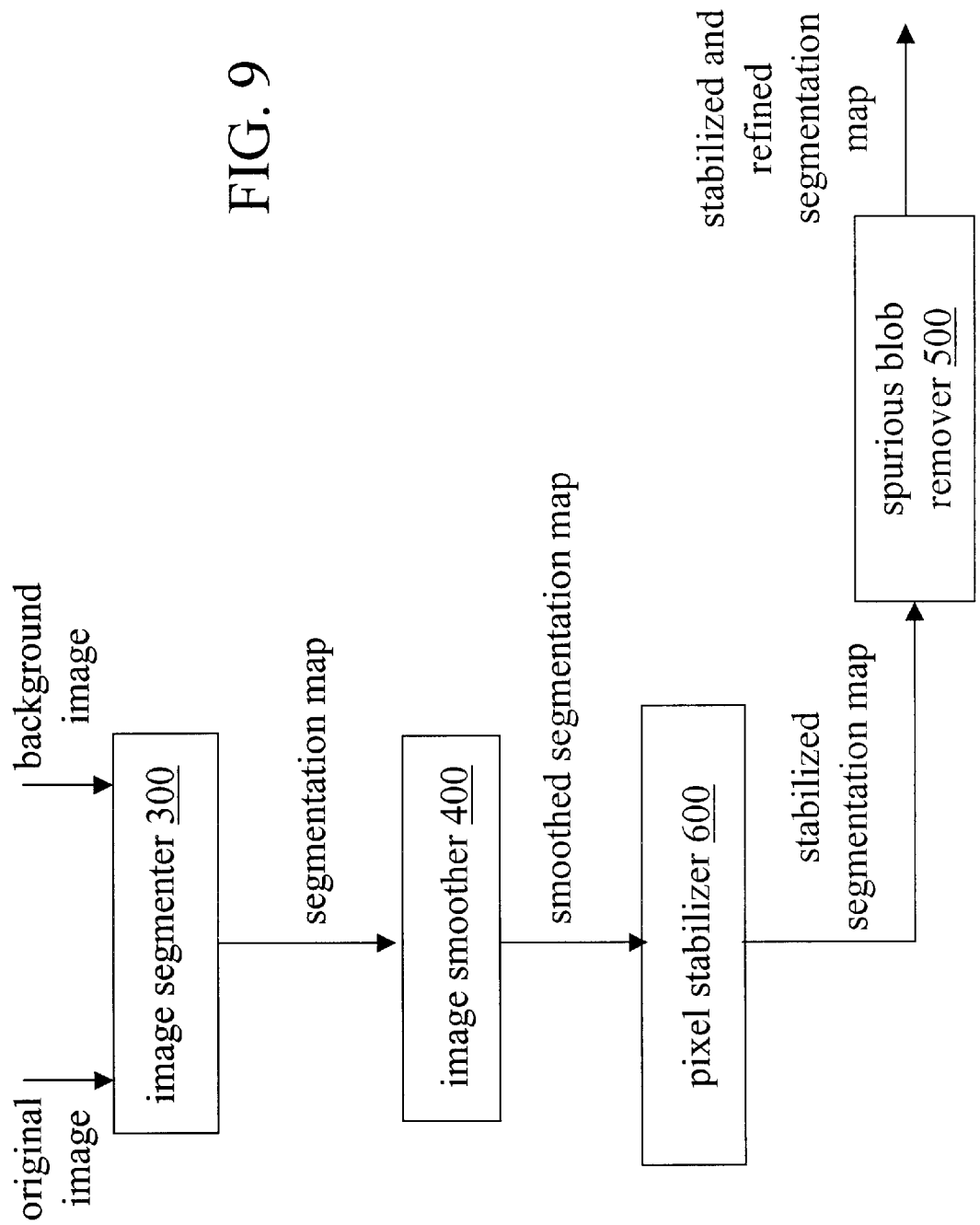
FIG. 9 shows a block diagram for an apparatus according to an embodiment of the invention.

Random noise may be introduced into the image sequence by external processes such as fluctuations in the scene lighting (especially fluorescent lighting), processes within the camera sensor such as thermal noise and shot noise, and other processes that may arise within the imaging hardware such as jitter and transmission line noise. This noise may cause the classification of pixels along the segmentation boundaries to vary between adjacent frames from background to foreground and back again, even if the foreground object has not moved, and may be manifested as visible flashes along the boundary of the object. In an apparatus according to a further embodiment of the invention as shown in FIG. 8, a pixel stabilizer 600 is applied to the refined segmentation map outputted by spurious blob remover 500. Pixel stabilizer 600 references the classification history of each pixel over a window of time (i.e. over a number of frames) in order to stabilize the pixel's current classification. For example, pixel stabilizer 600 may be implemented by applying one or more filtering techniques such as Kalman filtering to each pixel position in the temporal domain. In an apparatus as shown in FIG. 9, the segmentation map is stabilized before the spurious blobs are removed.

Figure 10:
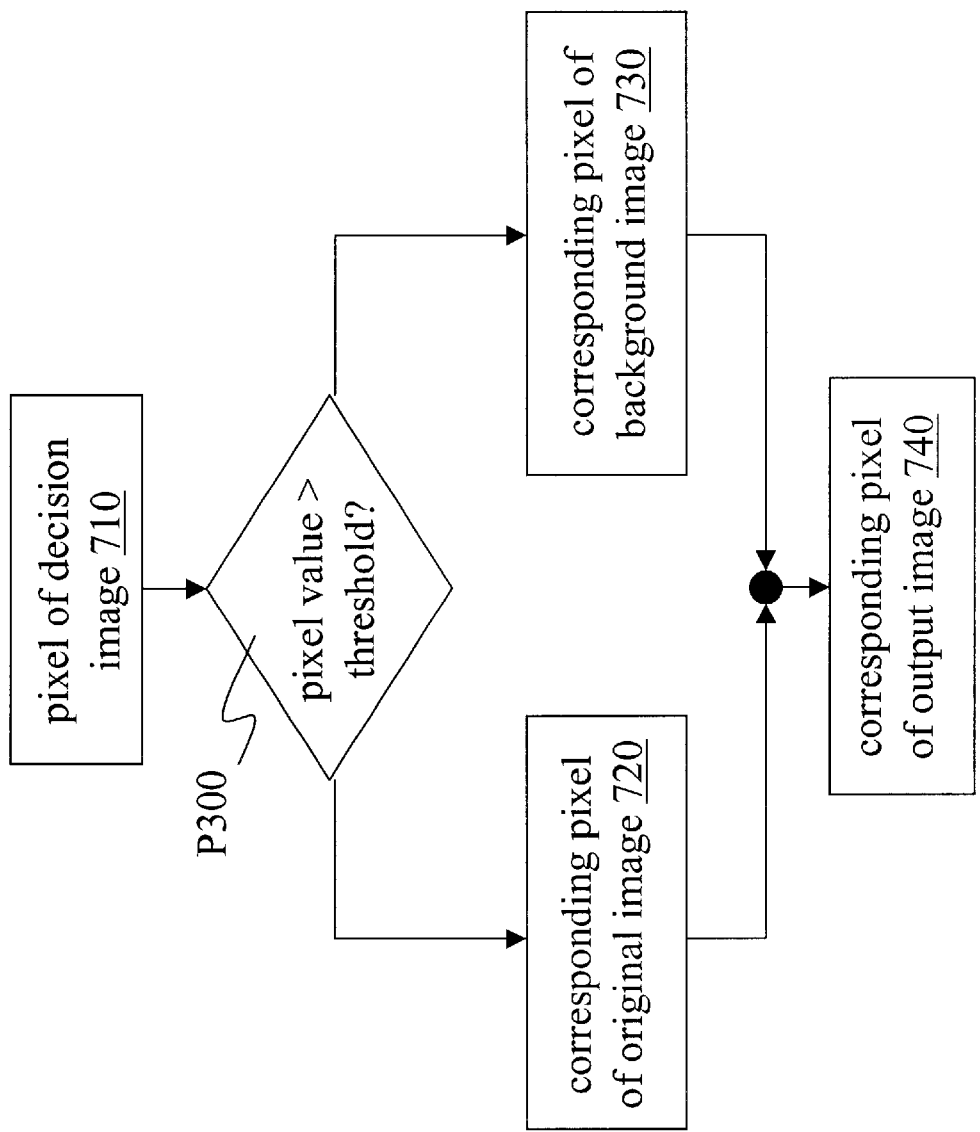
FIG. 10 shows a flow chart for a portion of a method according to an embodiment of the invention.

A segmentation map obtained as described above may be used to guide the superimposition of the foreground over a new background image to produce a new output image. In the example of FIG. 10, each pixel 740 in the new output image has two candidate values: the value of the corresponding pixel 720 in the original image and the value of the corresponding pixel 730 in the new background image. The choice between the two candidates is determined by the value of the corresponding pixel 710 in the decision image as indicated in task P300 (where the decision image may be a segmentation map modified, for example, by any of the apparatus shown in FIGS. 4, 6, 8, or 9). Note that many other decision mechanisms may be suitable for use in task P300. The new output image may then be transmitted, supplied to a storage device, or displayed on an output device such as a video screen or monitor.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. An apparatus comprising:
    a gradient calculator configured and arranged to calculate (a) a gradient in each among a plurality of directions, including at least a vertical, a horizontal, and two diagonal directions, the directions being defined relative to a center pixel, and to calculate (b) smoothing factors, each smoothing factor corresponding to one among the gradients, wherein the center pixel has eight eight-neighbor pixels, and wherein, for each of the directions, the gradient calculator calculates a corresponding gradient as a difference of values of only two of the eight-neighbor pixels for a corresponding direction; and a pixel value calculator configured and arranged to calculate a new value for the center pixel, the new value being expressed in terms of at least (c) a center pixel contribution and (d) a neighborhood contribution, wherein the center pixel contribution is expressed at least in terms of an original value for the center pixel and at least one smoothing weight, the smoothing weight being expressed at least in terms of one of the smoothing factors, and wherein the neighborhood contribution is expressed at least in terms of a smoothing product, wherein the smoothing product is expressed at least in terms of (e) one among the smoothing factors and (f) a value of a pixel that lies in the direction corresponding to the smoothing factor.

2. The apparatus according to claim 1, wherein the gradient calculator is further configured and arranged to calculate at least one among the smoothing factors at least in part by normalizing a magnitude of a corresponding gradient.

3. The apparatus according to claim 1, wherein at least one among the center pixel contribution and the neighborhood contribution is weighted by a factor related to the number of the corresponding plurality of directions.

4. The apparatus according to claim 1, wherein the new value for the center pixel is expressed in terms of at least the original value for the center pixel, the center pixel contribution, and the neighborhood contribution.

5. The apparatus according to claim 1, wherein a value of at least one among the gradients is independent of the original value of the center pixel.

6. The apparatus according to claim 1, wherein the directions include at least three directions that are not parallel to one another.

7. The apparatus according to claim 1, wherein the directions include at least two directions that are neither parallel nor orthogonal to one another.

8. An apparatus including a filter, said filter comprising:

a gradient calculator configured and arranged to calculate (a) a gradient in each among a plurality of directions, including at least a vertical, a horizontal, and two diagonal directions, the directions being defined relative to a center pixel having eight eight-neighbor pixels, the two diagonal directions being orthogonal to each other at the center pixel, and to calculate (b) smoothing factors, each smoothing factor corresponding to one among the gradients, wherein the center pixel has eight eight-neighbor pixels, and wherein, for each of the directions, the gradient calculator calculates a corresponding gradient as a difference of values of only two of the eight-neighbor pixels for a corresponding direction; and a pixel value calculator configured and arranged to calculate a filtered value for the center pixel, the filtered value being expressed in terms of at least a center pixel contribution and a neighborhood contribution, wherein the center pixel contribution is expressed at least in terms of an original value for the center pixel and at least one smoothing weight, the smoothing weight being expressed at least in terms of one of the smoothing factors, wherein the neighborhood contribution is expressed at least in terms of a smoothing product, wherein the smoothing product is expressed at least in terms of (e) one among the smoothing factors and (f) a value of a pixel that lies in the direction corresponding to the smoothing factor, wherein said filter is used to process each among substantially all of the pixels of an input image as a center pixel, and wherein a filtered image comprises the filtered values calculated for said substantially all of the pixels of the input image.

9. The apparatus according to claim 8, said input image being a segmentation map.

10. The apparatus according to claim 9, said segmentation map being obtained by comparing at least a portion of an original image to a portion of a corresponding background image.

11. The apparatus according to claim 9, a value of each among substantially all of said pixels of said segmentation map being obtained at least in part by comparing a value of a pixel of an original image with a value of a corresponding pixel of an image of a background, wherein said background appears in at least a portion of the original image.

12. The apparatus according to claim 11, wherein said comparing includes applying one among a first function and a second function, wherein the first function is applied when an intensity of the pixel of the original image is below a predetermined threshold, and wherein the second function is applied when the intensity of the pixel of the original image is above the predetermined threshold.

13. The apparatus according to claim 12, at least one among said first function and said second function being based at least in part upon a distance in color space between a value of the pixel in the original image and a value,of the corresponding pixel in the image of the background.

14. The apparatus according to claim 11, said apparatus further including a spurious blob remover to receive the filtered image and to produce a refined image, wherein said spurious blob remover identifies connected components in a binary image, said binary image being derived from the filtered image, and wherein for each among substantially all of the pixels in a connected component in the binary image, the value of a corresponding pixel in the refined image depends at least in part on the size of the connected component.

15. The apparatus according to claim 14, said apparatus further including a pixel stabilizer to receive the refined image and to produce a stabilized image, wherein said pixel stabilizer determines a value for a pixel in the stabilized image according to a classification history of a corresponding pixel in the refined image over a window of time.

16. The apparatus according to claim 15, wherein a first candidate for a value of a pixel in an output image is a value of a corresponding pixel in the original image, and wherein a second candidate for the value of the pixel in the output image is a value of a corresponding pixel in a background image, and wherein the value of the pixel in the output image is determined at least in part by a value of a corresponding pixel in the stabilized image.

17. A method comprising:

calculating a gradient in each among a plurality of directions, including at least a vertical, a horizontal, and two diagonal directions, the directions being defined relative to a center pixel, wherein the center pixel has eight eight-neighbor pixels, and wherein, for each of the directions, the gradient calculator calculates a corresponding gradient as a difference of values of only two of the eight-neighbor pixels for a corresponding direction;

for each among the gradients, calculating a corresponding smoothing factor; and calculating a new value for the center pixel, the new value being expressed in terms of at least a center pixel contribution and a neighborhood pixel contribution, wherein the center pixel contribution is expressed at least in terms of an original value for the center pixel and at least one smoothing weight, the smoothing weight being expressed at least in terms of one of the smoothing factors, and wherein the neighborhood contribution is expressed at least in terms of a smoothing product, wherein the smoothing product is expressed at least in terms of (a) one among the smoothing factors and (b) a value of a pixel that lies in the direction corresponding to the smoothing factor.

18. The method according to claim 17, wherein calculating at least one among said smoothing factors comprises normalizing a magnitude of a corresponding gradient.

19. The method according to claim 17, wherein at least one among the center pixel contribution and the neighborhood contribution is weighted by a factor related to the number of the corresponding plurality.

20. The method according to claim 17, wherein the new value for the center pixel is expressed in terms of at least the original value for the center pixel, the center pixel contribution, and the neighborhood contribution.

21. A method comprising filtering an input image, said filtering comprising:

calculating a gradient in each among a plurality of directions, including at least a vertical, a horizontal, and two diagonal directions, the directions being defined relative to a center pixel, wherein the center pixel has eight eight-neighbor pixels, and wherein, for each of the directions, the gradient calculator calculates a corresponding gradient as a difference of values of only two of the eight-neighbor pixels for a corresponding direction;

calculating smoothing factors, each smoothing factor corresponding to one among the gradients; and calculating a filtered value for the center pixel, the filtered value being expressed in terms of at least a center pixel contribution and a neighborhood contribution, wherein the center pixel contribution is expressed at least in terms of an original value for the center pixel and at least one smoothing weight, the smoothing weight being expressed at least in terms of one of the smoothing factors, and wherein the neighborhood contribution is expressed at least in terms of a smoothing product, wherein the smoothing product is expressed at least in terms of (a) one among the smoothing factors and (b) a value of a pixel that lies in the direction corresponding to the smoothing factor, wherein said filtering is performed to process each among substantially all of the pixels of an input image as a center pixel, and wherein a filtered image comprises the filtered values calculated for said substantially all of the pixels of the input image.

22. The method according to claim 21, said input image being a segmentation map.

23. The method according to claim 21, said segmentation map being obtained by comparing at least a portion of an original image to a portion of a corresponding background image.

24. The method according to claim 22, a value of each among substantially all of said pixels of said segmentation map being obtained at least in part by comparing a value of a pixel of an original image with a value of a corresponding pixel of an image of a background, wherein said background appears in at least a portion of the original image.

25. The method according to claim 24, wherein said comparing includes applying one among a first function and a second function, wherein the first function is applied when an intensity of the pixel of the original image is below a predetermined threshold, and wherein the second function is applied when the intensity of the pixel of the original image is above the predetermined threshold.

26. The method according to claim 25, at least one among said first function and said second function being based at least in part upon a distance in color space between a value of the pixel in the original image and a value of the corresponding pixel in the image of the background.

27. The method according to claim 24, said method further including removing spurious blobs from the filtered image to produce a refined image, wherein said removing spurious blobs comprises identifying connected components in a binary image, said binary image being derived from the filtered image, and wherein for each among substantially all of the pixels in a connected component in the binary image, the value of a corresponding pixel in the refined image depends at least in part on the size of the connected component.

28. The method according to claim 27, said method further including stabilizing pixels of the refined image to produce a stabilized image, wherein said stabilizing pixels comprises determining a value for a pixel in the stabilized image according to a classification history of a corresponding pixel in the refined image over a window of time.

29. The method according to claim 28, wherein a first candidate for a value of a pixel in an output image is a value of a corresponding pixel in the original image, and wherein a second candidate for the value of the pixel in the output image is a value of a corresponding pixel in a background image, and wherein the value of the pixel in the output image is determined at least in part by a value of a corresponding pixel in the stabilized image.

30. A data storage medium having machine-readable code stored thereon, the machine-readable code comprising instructions executable by an array of logic elements, the instructions defining a method comprising filtering an input image, said filtering comprising: calculating a gradient in each among a plurality of directions, including at least a vertical, a horizontal, and two diagonal directions, the directions being defined relative to a center pixel, wherein the center Pixel has eight eight-neighbor pixels, and wherein, for each of the directions, the gradient calculator calculates a corresponding gradient as a difference of values of only two of the eight-neighbor pixels for a corresponding direction;

calculating smoothing factors, each smoothing factor corresponding to one among the gradients; and calculating a filtered value for the center pixel, the filtered value being expressed in terms of at least a center pixel contribution and a neighborhood contribution, wherein the center pixel contribution is expressed at least in terms of an original value for the center pixel and at least one smoothing weight, the smoothing weight being expressed at least in terms of one of the smoothing factors, and wherein the neighborhood contribution is expressed at least in terms of a smoothing product, wherein the smoothing product is expressed at least in terms of (a) one among the smoothing factors and (b) a value of a pixel that lies in the direction corresponding to the smoothing factor, wherein said filtering is performed to process each among substantially all of the pixels of an input image as a center pixel, and wherein a filtered image comprises the filtered values calculated for said substantially all of the pixels of the input image.

31. A method according to claim 30, said method further comprising producing an output image, wherein the input image is a segmentation map of an original image, and wherein a first candidate for a value of a pixel in the output image is a value of a corresponding pixel in the original image, and wherein a second candidate for the value of the pixel in the output image is a value of a corresponding pixel in a background image, and wherein the value of the pixel in the output image is determined at least in part by a value of a corresponding pixel in the filtered image.

* * * * *